United States Patent [19]

Lane

[11] 4,390,102
[45] Jun. 28, 1983

[54] SUPPORT UNIT FOR PACKAGED CONVENIENCE FOODS

[76] Inventor: Gerald H. Lane, 100 Cerreda Ceilo, Suisun City, Calif. 94585

[21] Appl. No.: 160,954

[22] Filed: Jun. 19, 1980

[51] Int. Cl.³ .............................................. A47F 7/00
[52] U.S. Cl. ..................................... 211/71; 211/118
[58] Field of Search .................. 211/71, 87, 113, 118; 248/220.2, 222.4, 210, 211, 312.1, 310, 339, 340, 341

[56] References Cited

U.S. PATENT DOCUMENTS

| | | | |
|---|---|---|---|
| 336,123 | 2/1886 | Leggitt | 211/113 |
| 539,364 | 5/1895 | Lipphard | 248/222.4 X |
| 1,055,522 | 3/1913 | Cumming | 211/87 |
| 1,611,397 | 12/1926 | Wells | 211/113 X |
| 1,666,293 | 4/1928 | Lorton | 211/71 |
| 2,427,416 | 9/1947 | Peterson | 248/312.1 |
| 2,699,924 | 1/1955 | Volkmar | 248/312.1 X |
| 3,190,454 | 6/1965 | Brooks | 211/71 |
| 3,212,647 | 10/1965 | Meyer et al. | 211/118 |

FOREIGN PATENT DOCUMENTS

| | | | |
|---|---|---|---|
| 168191 | 4/1951 | Austria | 211/87 |
| 2729 | of 1906 | United Kingdom | 248/222.4 |

Primary Examiner—Francis K. Zugel
Assistant Examiner—Robert W. Gibson, Jr.
Attorney, Agent, or Firm—Flehr, Hohbach, Test, Albritton & Herbert; Flehr, Hohbach, Test, Albritton & Herbert

[57] ABSTRACT

A unit to support while eating packaged convenience foods such as hamburgers, french fries and soda pop comprises an elongated standard and a set of holding members having connectors insertable into the body of the standard. The holding members have reentry portions for engaging or impaling the package of convenience foods and a hanger is provided at one end of the unit so that the unit when assembled and loaded with convenience foods may be suspended like a pendulum from the rear view mirror assembly of a motor vehicle.

3 Claims, 8 Drawing Figures

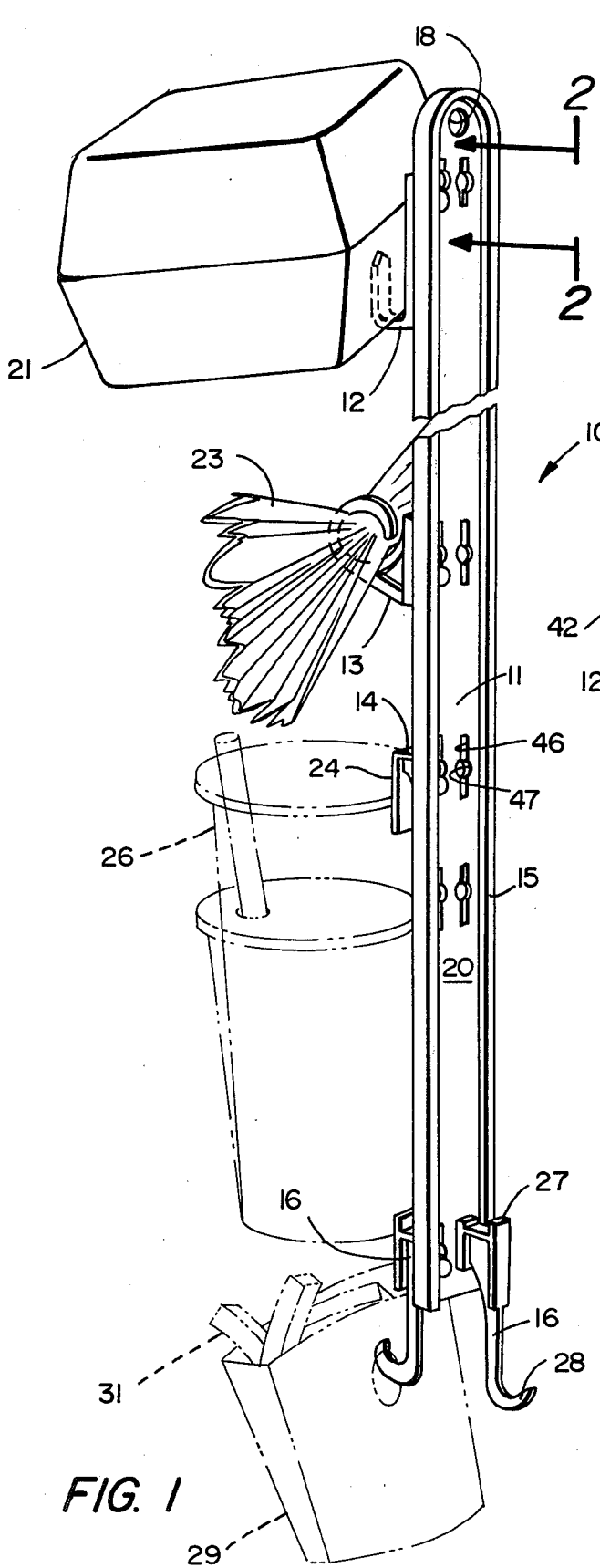
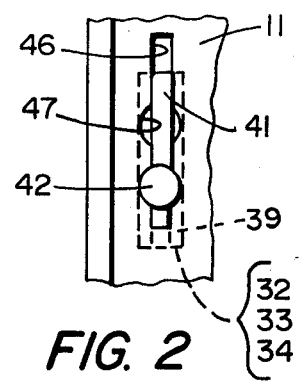
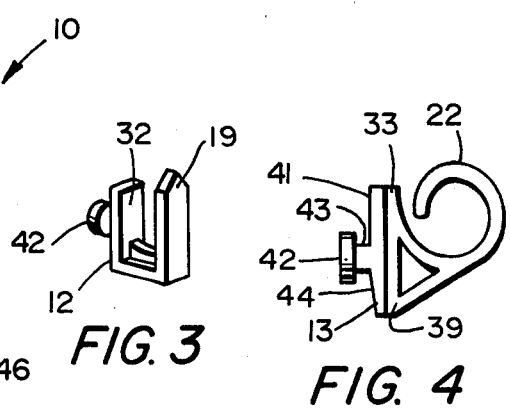
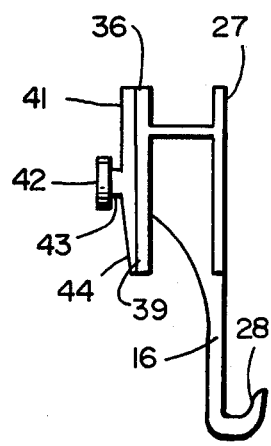
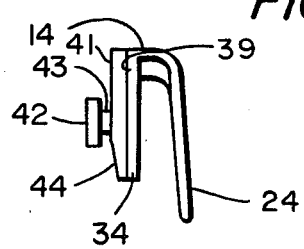

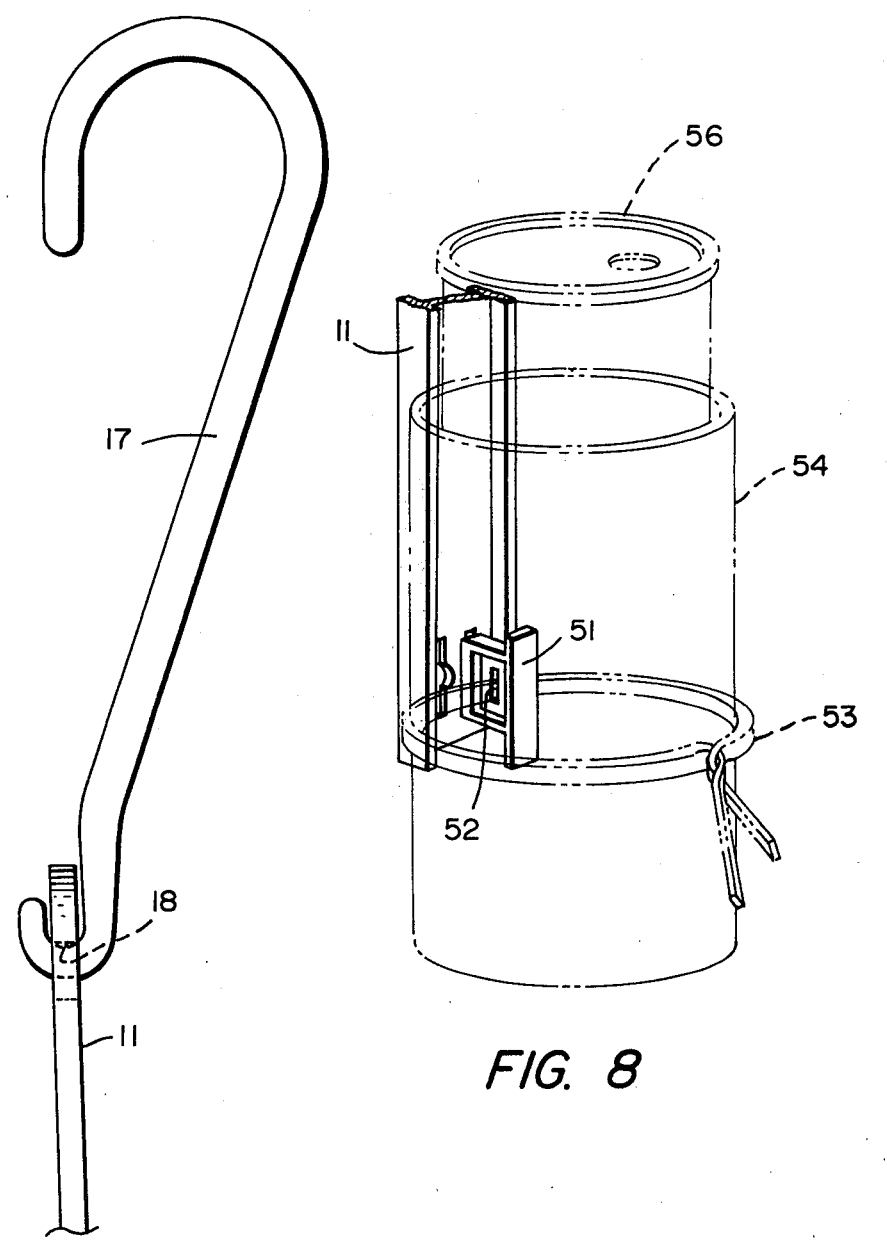

SUPPORT UNIT FOR PACKAGED CONVENIENCE FOODS

This invention relates to packaging of convenience foods such as hamburgers, french fried potatoes, tissue napkins and soda pop and specifically concerns a holding unit for retaining packages of convenience foods in upright condition for ready access for consumption while minimizing the risks of spilling.

Well established in the consciousness of the American consumer is the existence of fast food outlets such as those using the service marks of "McDonalds," "Burger King," "A & W," "Dairy Queen" and the like, the gross annular revenues of this form of retail merchandising exceeding a billion dollars per year. Typically, retail food outlets in this field present their particular food products to the customer in individual packages such as containers for hamburgers in box configurations; containers for french fried potatoes in scoop configuration; and containers for liquids in either open or closed cup configurations. These foods are either eaten on the premises or are carried away for consumption very frequently in the passenger compartments of a motor vehicle. A customer's order is generally assembled together and placed in a paper bag which the customer sorts through, identifying and selecting the edible materials he desires. Some care is required for avoiding spillage of these convenience foods when eating while the automobile vehicle is in motion and especially so where the person driving is also eating and drinking.

An object of the present invention is to provide a support unit for packaged convenience foods which may be suspended in a motor vehicle, such as from the mirror support, to hold the convenience foods in pendulum-like support while the vehicle is moving.

Another object of the invention is to provide a support unit for convenience foods which may be readily assembled from its component parts by unskilled persons and wherein the manner of use of the unit with containers of convenience foods requires but little training so that its usefulness may be readily appreciated by the consuming public.

Another object of the invention is to provide a support unit of the type described which has an after use in the household for organizing decorative or useful materials in a neat and orderly position.

Another object of the invention is to provide a support unit which is adapted to hold convenience foods packaged in foil containers, cups, boxes, and the like, and including provisions for retaining tissue napkins.

In summary, the invention includes an elongate standard and a set of holding members mountable with the standard at defined locations where connection means are provided between the holding members and the standard. The connection means include a slot-like opening having an enlarged portion and a protuberant member for receipt in the enlargement for wedge-like engagement between the holding members and the standard. The holding members in the set have reentrant portions for engaging the food packages and a hanger is mounted at one end of the standard for mounting the unit upon a horizontal member.

FIG. 1 is a perspective view of the SUPPORT UNIT FOR PACKAGED CONVENIENCE FOODS of the present invention and showing in broken lines packages of convenience foods typically mounted on the unit;

FIG. 2 is a partial sectional view in the direction of the arrows 2—2 of FIG. 1;

FIG. 3 is a perspective view of one of the holding members of the set of holding members associated with the support unit;

FIGS. 4, 5 and 6 are each side elevation views of holding members of the set associated with the support unit;

FIG. 7 is an elevation view of a portion of a support unit of FIG. 1 and its hanger; and FIG. 8 is a perspective view of the standard shown in FIG. 1 partially broken away and illustrating yet another holding member used in the present invention.

A preferred embodiment of the invention is shown in the drawings where a support unit 10 is shown in FIG. 1 as comprising an elongate standard 11 having a peripheral flange 15 and a flat web 20 equipped with a plurality of holding members 12, 13, 14 and 16. A hanger 17 is received in the opening 18 at the top end of the standard 11, FIG. 7, so that the unit 10 may be supported from the strut on an automobile rear view mirror, grab handle, coat hook or the like appurtenance in the motor vehicle, not shown.

The holding members 12–14, 16 in the set may be individually designed to perform distinct holding functions or dual holding functions in regard to the packages of convenience foods. Accordingly, the holding member 12 includes a reentrant prong 19 (FIG. 3) which serves to impale the bottom portion of a box 21 containing a hamburger. The holding member 13, FIG. 4, includes a reentrant or open ring 22 into which a tissue napkin 23 may be mounted for easy removal as shown in FIG. 1. The holding member 14, FIG. 5, is specially adapted by reason of the finger 24 to retain the top portion of a beverage cup 26 adjacent to the standard 11. The holding member 16, FIG. 6, affords a dual holding function in that an upwardly extending lip 27 serves to engage the bottom portion of the beverage cup 26, thus collaborating with the finger 24 for positioning the cup in upright attitude along the standard 11. A hook-like member 28 on the holding member 16 provides the function of holding a box 29 containing an order of french fried potatoes 31.

It is apparent from the above description of holding members 12–14, 16 that each includes an active holding member of reentrant configuration; that is, the prong 19 on the holding member 12 is disposed in a reentrant position with respect to the body 32 of member 12; the open or reentrant ring 22 has a reentrant relationship to the body portion 33 of member 13; the finger 24 of member 14 is disposed in a reentrant relationship to the body 34 of member 14; the upstanding lip 27 of member 16 has a similar relationship to the base 36 of member 16.

Means for readily connecting the holding member 12–14, 16 to the standard 11 are provided on the support unit in a form which may be readily understood and easily manipulated by persons of relatively unsophisticated mechanical skill. Referring particularly to FIG. 2 taken in connection with FIGS. 3–6, it will be seen that base portions of the holding members includes a generally flat surface 39 for engagement with one side of the web 20 of the standard 11. A rib 41 extends across the flat surface 39 of the holding member and a protuberant member 42 extends from the body of the holding member along the rib 41. One preferred form of member 42 is the shape of a nail head with a circular outer portion and a smaller neck 43 which may be either circular or rectangular in cross section and of a width substantially the same as that of the width of the rib 41. For ease of assembly to be described more specifically below, the rib 41 may be tapered towards one end 44 of the holding members as shown clearly in FIGS. 4–6.

Openings are provided in the web 20 along the length of the standard 11 serving to receive the tapered rib 41 and the protuberant member 42 for connecting the holding members to the standard. As shown in FIG. 1, the openings 46 are slit shaped, extending parallel to the long axis of the standard 11 and each has a medial enlargement of the size complimentary to the protuberant member 42. Thus, the assembly procedure is to insert the tapered portion 44 of the rib 41 into the slit 46 and urge the rib towards one end of the slit to where the protuberant portion will be received through the enlargement 47 and then to urge the unit further along the slit portion to effect somewhat of a cam or gripping action between the underside of the protuberant member 42 and the surface of the body 32, 33, 34 of the holding members as bearing against the continuous side portions of the standard 11.

The openings 46 in the standard are conveniently arranged in pairs so that holding members may be placed on opposite sides of the standard member to afford a counterbalance effect so that the unit can hang substantially vertically from the hanger 17. It is recognized, however, that in the drawings the associated containers 21, 23, 26, 29 are all shown disposed on one side of the standard 11, this being done for purposes of illustration and it should be understood that holding members are disposed on both sides of the standard as shown in the lower portion of FIG. 1.

In use the standard and holding members would be assembled together by the retail service establishment so that the packages of convenience food could be placed on the standard either by the consumer or by the person serving the food.

In FIG. 8 there is shown still another version of holding member 51 having an opening 52 through its body through which a ribbon-like wire tie member 53 may be placed for wrapping around an insulated cylindrical holder 54, a chilled can or the like 56 may be received within the holder 54 and supported by the standard 11.

One preferred form of the invention has been illustrated and described herein but adjustments and modifications to its components may be made by those skilled in the field. Hence, the invention shall be construed only in accordance with the terms of the claims which follow.

What is claimed is:

1. A suspendable mobile support for packages or containers of convenience food items such as hamburgers, french fried potatoes, beverages and the like, comprising:

an elongated standard with means for suspending same in pendulum fashion at its upper end from a support, for example a motor vehicle interior;

said standard including a central, longitudinally extending, generally planar web portion having at least two laterally spaced rows of longitudinal slot like openings extending therethrough along its length, said openings including enlarged portions;

a set of holding members for holding said packages, each holding member including a reentrant portion for engaging said packages, and a base portion arranged to be mechanically quickly interlocked with the standard without a separate fastener means;

each base portion of said holding members including a flat body portion from which protrudes an elongate rib and an enlarged head, said rib and head arranged to mechanically interlock in quick fashion with one of said slot-like openings in said web of the standard with said head extending through the opening for retaining said holding member at a single position against the web in stable fashion;

said set of holding members including at least one holding member including means for impaling and supporting the bottom edge of a hamburger package or container; at least one holding member for engaging and retaining the upper portion of a beverage container; and at least one holding member including retaining lip means for engaging and supporting the bottom portion of a beverage container adjacent the standard, said last-mentioned holding member having a depending, hook-like member disposed below said retaining lip means, said hook-like member arranged to engage and support another food package beneath a beverage container supported by said last-mentioned holding member.

2. A suspendable support for packages as claimed in claim 1, wherein said slot-like openings in said web portion are disposed so that pairs of openings are disposed at approximately the same longitudinal location along the web.

3. A suspendable support for packages as claimed in claim 1, wherein said set of holding members includes at least one holding member including a ring-like means for retaining a tissue napkin.

* * * * *